US011840963B2

(12) United States Patent
Shiraishi et al.

(10) Patent No.: US 11,840,963 B2
(45) Date of Patent: Dec. 12, 2023

(54) ACOUSTIC ATTENUATOR, TUBE ASSEMBLY, COMBUSTOR, GAS TURBINE, AND METHOD FOR MANUFACTURING TUBE ASSEMBLY

(71) Applicant: Mitsubishi Power, Ltd., Yokohama (JP)

(72) Inventors: Hirokazu Shiraishi, Yokohama (JP); Tatsuya Nadayoshi, Yokohama (JP); Kentaro Murakami, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 19 days.

(21) Appl. No.: 17/623,407

(22) PCT Filed: Jul. 28, 2020

(86) PCT No.: PCT/JP2020/028810
§ 371 (c)(1),
(2) Date: Dec. 28, 2021

(87) PCT Pub. No.: WO2021/020372
PCT Pub. Date: Feb. 4, 2021

(65) Prior Publication Data
US 2022/0349346 A1 Nov. 3, 2022

(30) Foreign Application Priority Data
Aug. 1, 2019 (JP) ................. 2019-142446

(51) Int. Cl.
*F02C 7/24* (2006.01)
*F23R 3/00* (2006.01)
*F23R 3/16* (2006.01)

(52) U.S. Cl.
CPC ............... *F02C 7/24* (2013.01); *F23R 3/002* (2013.01); *F23R 3/16* (2013.01)

(58) Field of Classification Search
CPC .. F23R 2900/00014; F23R 3/002; F23R 3/06; F23M 20/005; F05D 2260/963;
(Continued)

(56) References Cited

U.S. PATENT DOCUMENTS 4,944,362 A * 7/1990 Motsinger ............... F02K 1/827
181/292
5,589,242 A * 12/1996 Stief ................... F04B 39/0033
428/218
(Continued)

FOREIGN PATENT DOCUMENTS

EP 2385303 A1 11/2011
EP 3281192 B1 * 12/2022 ............... B24C 1/04
(Continued)

OTHER PUBLICATIONS

International Search Report dated Sep. 29, 2020, issued in counterpart Application No. PCT/JP2020/028810, with English Translation. (6 pages).
(Continued)

*Primary Examiner* — Craig Kim
(74) *Attorney, Agent, or Firm* — WHDA, LLP

(57) ABSTRACT

An acoustic attenuator comprises a first attenuation unit, a second attenuation unit, a welded section, and a communication part. A first acoustic damper is provided on an outer surface of a first acoustic liner, which faces toward a side opposite from an object, to form a first damper space that communicates with an internal space of the object. The second attenuation unit is attached to an outer surface of the object. The welded section is provided at least between the first acoustic damper and a second acoustic damper. The welded section secures the second attenuation unit to the first acoustic liner. The communication part is disposed in a position farther from an outer surface of the object than the
(Continued)

welded section, allowing communication between the first damper space and a second damper space.

12 Claims, 12 Drawing Sheets

(58) Field of Classification Search
CPC .. F05D 2260/96; F05D 2220/32; F01D 9/023; F02C 7/24; F02C 7/045; G10K 11/172
See application file for complete search history.

(56) References Cited

U.S. PATENT DOCUMENTS

| | | | | |
|---|---|---|---|---|
| 6,530,221 | B1* | 3/2003 | Sattinger | F23M 20/005 60/725 |
| 8,733,496 | B2* | 5/2014 | Ono | F23R 3/06 181/213 |
| 8,973,365 | B2* | 3/2015 | Corr | F23R 3/44 60/725 |
| 8,991,185 | B2* | 3/2015 | Huber | F23M 20/005 60/725 |
| 9,410,484 | B2* | 8/2016 | Schilp | F02C 7/12 |
| 9,857,079 | B2* | 1/2018 | Huber | F23M 20/005 |
| 10,436,118 | B2* | 10/2019 | Weaver | G10K 11/168 |
| 10,546,070 | B2* | 1/2020 | Hellat | G06F 30/00 |
| 10,584,610 | B2* | 3/2020 | Hoffman | F23R 3/28 |
| 10,844,792 | B2* | 11/2020 | Kugimiya | F01D 25/26 |
| 11,022,304 | B2* | 6/2021 | Taniguchi | F23R 3/002 |
| 11,028,705 | B2* | 6/2021 | Abu-Irshaid | F01D 25/12 |
| 11,114,080 | B2* | 9/2021 | Lee | G10K 11/162 |
| 11,326,780 | B2* | 5/2022 | Fujimoto | F02C 9/28 |
| 2002/0152751 | A1 | 10/2002 | Mandai et al. | |
| 2005/0034918 | A1* | 2/2005 | Bland | F23M 20/005 181/266 |
| 2005/0097890 | A1 | 5/2005 | Ikeda et al. | |
| 2005/0223707 | A1* | 10/2005 | Ikeda | F23R 3/04 60/725 |
| 2007/0169992 | A1* | 7/2007 | Wasif | F23M 20/005 181/293 |
| 2011/0220433 | A1* | 9/2011 | Nakamura | F23M 20/005 181/213 |
| 2012/0006028 | A1* | 1/2012 | Lee | F23R 3/06 60/725 |
| 2012/0198854 | A1* | 8/2012 | Schilp | F23R 3/06 60/755 |
| 2015/0020498 | A1* | 1/2015 | Schilp | F01D 9/023 60/39.83 |
| 2016/0003162 | A1* | 1/2016 | Beck | F23R 3/002 60/725 |
| 2018/0180288 | A1 | 6/2018 | Kugimiya et al. | |

FOREIGN PATENT DOCUMENTS

| | | |
|---|---|---|
| JP | 2002-317933 A | 10/2002 |
| JP | 2005-076982 A | 3/2005 |
| JP | 2007-132640 A | 5/2007 |
| JP | 2008-121961 A | 5/2008 |
| JP | 2017-020682 A | 1/2017 |

OTHER PUBLICATIONS

Written Opinion dated Sep. 29, 2020, issued in counterpart Application No. PCT/JP2020/028810, with English Translation. (6 pages).

* cited by examiner

ACOUSTIC ATTENUATOR, TUBE ASSEMBLY, COMBUSTOR, GAS TURBINE, AND METHOD FOR MANUFACTURING TUBE ASSEMBLY

TECHNICAL FIELD

The present invention relates to an acoustic damping device, a tube assembly, a combustor, a gas turbine, and a method for producing a tube assembly.

Priority is claimed on Japanese Patent Application No. 2019-142446, filed Aug. 1, 2019, the content of which is incorporated herein by reference.

BACKGROUND ART

A combustor of a gas turbine may include an acoustic damping device that dampens combustion vibrations. As such an acoustic damping device, there is an acoustic damping device including an acoustic damper or an acoustic liner that forms a plurality of spaces communicating with a combustion chamber of the combustor. The plurality of spaces that the acoustic damper or the acoustic liner forms are capable of dampening combustion vibrations in predetermined frequency bands that are different from each other.

PTL 1 discloses a technique of disposing a second casing portion on an outer peripheral side of a first casing portion in order to prevent the restriction of an installation space or of cost from limiting the number of acoustic liners to be installed.

CITATION LIST

Patent Literature

[PTL 1] Japanese Unexamined Patent Application Publication No. 2017-020682

SUMMARY OF INVENTION

Technical Problem

The acoustic damping device is formed of a large number of components. The large number of components are integrated by welding work, or the like. For this reason, the work of assembling an acoustic damping device including a plurality of spaces as in PTL 1 becomes complicated, and a burden on a worker is increased, which is a problem.

The invention is conceived in light of the above circumstances, and provides an acoustic damping device, a tube assembly, a combustor, a gas turbine, and a method for producing a tube assembly capable of facilitating assembly work and reducing a burden on a worker.

Solution to Problem

The following configurations are adopted to solve the above problem.

According to a first aspect of the invention, there is provided an acoustic damping device including: a first damping unit; a second damping unit; a weld portion; and a communication portion. The first damping unit includes a first acoustic liner and a first acoustic damper. The first acoustic liner is to be attached to an outer surface of an object to form a first liner space communicating with an internal space of the object. The first acoustic damper is to be provided on an outer surface of the acoustic liner to form a first damper space communicating with the internal space of the object, the outer surface facing a side opposite the object. A second acoustic damper is to be attached to the outer surface of the object. The second damping unit includes the second acoustic damper. The second acoustic damper forms a second damper space disposed away from the first acoustic damper. The weld portion is to be provided at least at a location between the first acoustic damper and the second acoustic damper. The weld portion fixes the second damping unit to the first acoustic liner or to the outer surface of the object. The communication portion is to be disposed at a position farther from the outer surface of the object than the weld portion, to allow the first damper space and the second damper space to communicate with each other.

In the acoustic damping device of the first aspect, the first acoustic damper and the second acoustic damper are disposed away from each other. For this reason, when the work of fixing the first damping unit to the outer surface of the object via the weld portion and the work of fixing the second damping unit to the outer surface of the object or to the first damping unit via the weld portion are performed, the weld portion can be easily formed by using a gap between the first acoustic damper and the second acoustic damper. For this reason, even after each of the first damping unit and the second damping unit is assembled, the first damping unit and the second damping unit can be easily installed. In the first aspect, since the communication portion is further provided which is disposed at a position farther from the outer surface of the object than the weld portion, the communication portion can be disposed across the weld portion after the weld portion is formed, to allow the second acoustic damper to communicate with the first acoustic damper. Therefore, assembly work can be facilitated, and a burden on a worker can be reduced.

According to a second aspect of the invention, in the acoustic damping device according to the first aspect, an edge of the first acoustic liner on a side close to the second damping unit may be disposed closer to the second damping unit than an edge of the first acoustic damper on the side close to the second damping unit.

With such a configuration, even when the first damping unit and the second damping unit are disposed close to each other, for example, when the second damping unit is directly fixed to the first acoustic liner of the first damping unit via the weld portion, a space for the work of forming the weld portion between the first acoustic damper and the second acoustic damper can be secured.

According to a third aspect of the invention, the second damping unit according to the first or second aspect may include a base portion to be attached to the outer surface of the object. The second acoustic damper may be provided on an outer surface of the base portion, the outer surface facing the side opposite the object.

With such a configuration, the position of the first acoustic damper in the first damping unit and the position of the second acoustic damper in the second damping unit can be aligned in a direction away from the outer surface of the object. Therefore, the work of fixing the communication portion to the first acoustic damper and to the second acoustic damper can be easily performed.

According to a fourth aspect of the invention, the base portion according to the third aspect may form a second liner space communicating with the internal space of the object.

With such a configuration, the inside of the base portion can be effectively used as the second liner space.

According to a fifth aspect of the invention, the object according to any one of the first to fourth aspects may be formed in a tubular shape. The second damping unit may be disposed in at least one of an axial direction in which a central axis of the object extends and a circumferential direction around the central axis of the object with respect to the first damping unit.

With such a configuration, the second acoustic damper of the second damping unit can be connected to the first acoustic damper of the first damping unit in the axial direction. Further, the second acoustic damper of the second damping unit can be connected to the first acoustic damper of the first damping unit in the circumferential direction.

According to a sixth aspect of the invention, there is provided a tube assembly including: a tube body formed in a tubular shape; and the acoustic damping device according to any one of the first to fifth aspects that is fixed to an outer peripheral surface of the tube body.

With such a configuration, the acoustic damping device can be easily attached to the outer peripheral surface of the tube body.

According to a seventh aspect of the invention, there is provided a combustor including: the tube assembly according to the sixth aspect; and a burner that injects fuel into the tube body.

With such a configuration, an acoustic damping device that dampens combustion vibrations of the combustor can be easily attached to a combustion tube of the combustor.

According to an eighth aspect of the invention, there is provided a gas turbine including: the combustor according to the seventh aspect; and a turbine to be driven by combustion gas generated by the combustor.

With such a configuration, man-hours for production of the gas turbine including the combustor equipped with an acoustic damping device can be reduced.

According to a ninth aspect of the invention, there is provided a method for producing a tube assembly, the method including: a step of assembling a first damping unit; a step of assembling a second damping unit; a step of preparing a communication portion; a step of fixing the first damping unit to an outer surface of a tube body via welding; a step of fixing the second damping unit; and a step of causing a first damper space and a second damper space to communicate with each other. Here, the first damping unit includes a first acoustic liner forming a first liner space and a first acoustic damper forming a first damper space. The second damping unit includes a second acoustic damper forming a second damper space. The first damper space and the second damper space communicate with each other through the communication portion. In the step of fixing the second damping unit, the second damping unit is to be welded and fixed to the first acoustic liner of the first damping unit or to an outer surface of an object at least at a location between the first acoustic damper and the second acoustic damper. In the step of causing the first damper space and the second damper space to communicate with each other, the communication portion is to be disposed across a weld portion formed by the welding, and a first end portion of the communication portion is to be fixed to the first acoustic damper via welding. In the step of causing the first damper space and the second damper space to communicate with each other, further, a second end portion of the communication portion is to be fixed to the second acoustic damper via welding.

In such a manner, when the first damping unit and the second damping unit are individually assembled, and then each of the first damping unit and the second damping unit is fixed via welding, the first acoustic damper and the second acoustic damper can be disposed away from each other. For this reason, the weld portion to be disposed between the first damping unit and the second damping unit can be easily formed. In addition, after the weld portion is formed, the first acoustic damper and the second acoustic damper can communicate with each other through the communication portion. Therefore, the tube assembly can be easily produced.

Advantageous Effects of Invention

Assembling can be easily performed according to the acoustic damping device, the tube assembly, the combustor, the gas turbine, and the method for producing a tube assembly.

DESCRIPTION OF EMBODIMENTS

Next, an acoustic damping device, a tube assembly, a combustor, a gas turbine, and a method for producing a tube assembly in a first embodiment of the invention will be described with reference to the drawings.

First Embodiment

Figure 1:
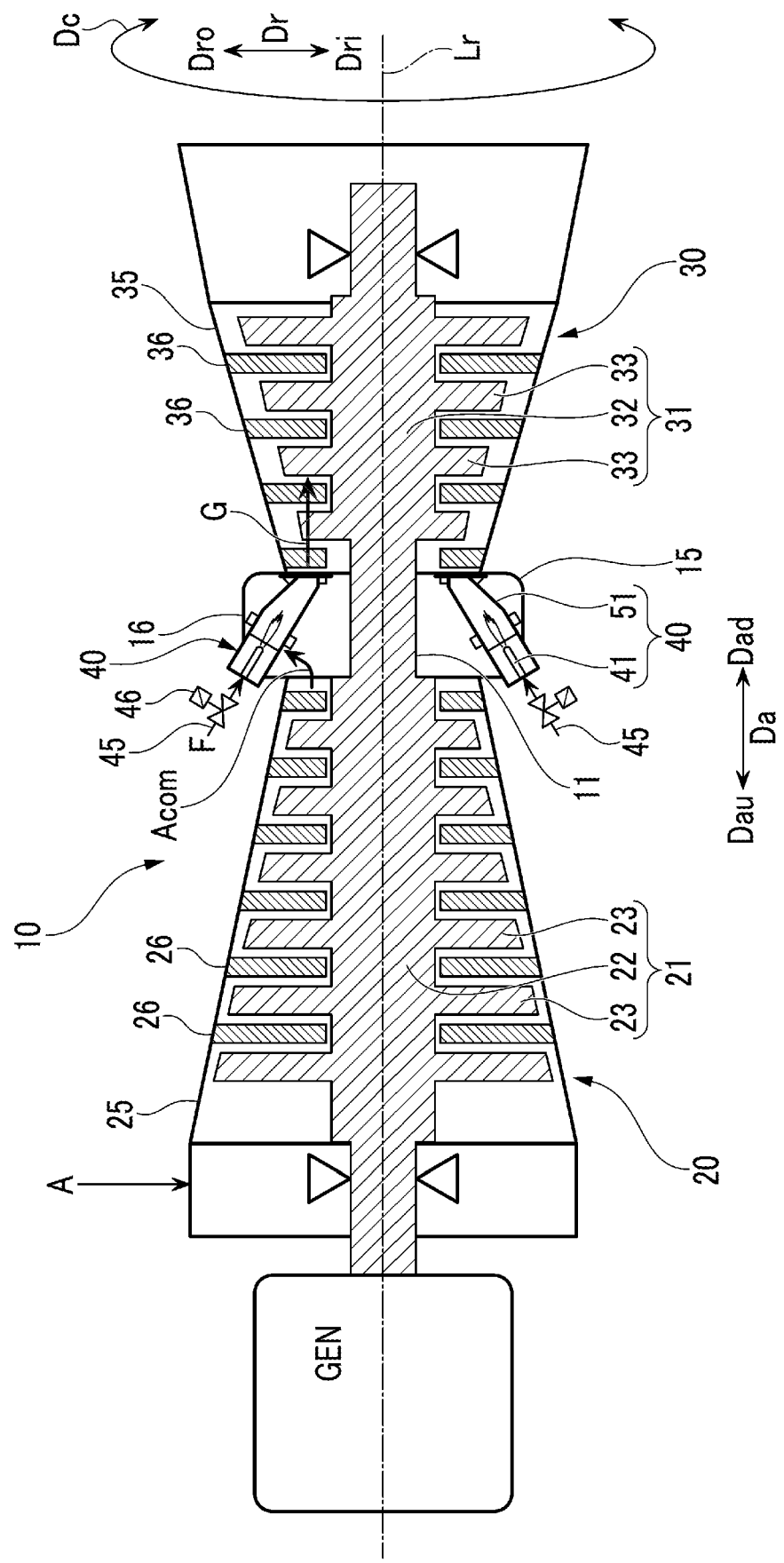
FIG. 1 is a conceptual view illustrating a configuration of a gas turbine in a first embodiment of the invention.

FIG. 1 is a conceptual view illustrating a configuration of a gas turbine in a first embodiment of the invention.

As illustrated in FIG. 1, a gas turbine 10 includes a compressor 20 that compresses air A; a plurality of combustors 40 that combust fuel in the air compressed by the compressor 20 to generate combustion gas G; and a turbine 30 to be driven by the combustion gas G.

The compressor 20 includes a compressor rotor 21 that rotates around a rotor axis Lr; a compressor casing 25 that rotatably covers the compressor rotor 21; and a plurality of stator vane rows 26. Hereinafter, a direction in which the rotor axis Lr extends is referred to as a rotor axial direction Da, and one side and the other side in the rotor axial direction Da are referred to as an axial upstream side Dau and an axial downstream side Dad, respectively. In addition, a circumferential direction around the rotor axis Lr is simply referred to as a circumferential direction Dc, and a direction perpendicular to the rotor axis Lr is referred as a radial direction Dr. Further, a side approaching the rotor axis Lr in the radial direction Dr is referred to as a radial inner side Dri, and an opposite side is referred to as a radial outer side Dro.

The compressor rotor 21 includes a rotor shaft 22 extending along the rotor axis Lr in the rotor axial direction Da, and a plurality of rotor blade rows 23 attached to the rotor shaft 22. The plurality of rotor blade rows 23 are arranged in the rotor axial direction Da. Each of the rotor blade rows 23 is formed of a plurality of rotor blades arranged in the circumferential direction Dc. One stator vane row 26 of the plurality of stator vane rows 26 is disposed on the axial downstream side Dad of each of the plurality of rotor blade rows 23. Each of the stator vane rows 26 is provided inside the compressor casing 25. Each of the stator vane rows 26 is formed of a plurality of stator vanes arranged in the circumferential direction Dc. An annular space between the radial outer side Dro of the rotor shaft 22 and the radial inner side Dri of the compressor casing 25 in a region in which the stator vanes and the rotor blades are disposed in the rotor axial direction Da forms an air compression flow path in which the air is to be compressed while flowing therethrough.

The turbine 30 is disposed on the axial downstream side Dad of the compressor 20. The turbine 30 includes a turbine rotor 31 that rotates around the rotor axis Lr; a turbine casing 35 that rotatably covers the turbine rotor 31; and a plurality of stator vane rows 36. The turbine rotor 31 includes a rotor shaft 32 extending along the rotor axis Lr in the rotor axial direction Da, and a plurality of rotor blade rows 33 attached to the rotor shaft 32. The plurality of rotor blade rows 33 are arranged in the rotor axial direction Da. Each of the rotor blade rows 33 is formed of a plurality of rotor blades arranged in the circumferential direction Dc.

One stator vane row 36 of the plurality of stator vane rows 36 is disposed on the axial upstream side Dau of each of the plurality of rotor blade rows 33. Each of the stator vane rows 36 is provided inside the turbine casing 35. Each of the stator vane rows 36 is formed of a plurality of stator vanes arranged in the circumferential direction Dc. An annular space between the radial outer side Dro of the rotor shaft 32 and the radial inner side Dri of the turbine casing 35 in a region in which the stator vanes and the rotor blades are disposed in the rotor axial direction Da forms a combustion gas flow path through which the combustion gas G from the combustors 40 flows.

The compressor rotor 21 and the turbine rotor 31 are located on the same rotor axis Lr, and are connected to each other to form a gas turbine rotor 11. For example, a rotor of a generator GEN is connected to the gas turbine rotor 11. The gas turbine 10 further includes an intermediate casing 16 having a tubular shape and having the rotor axis Lr as a center.

The intermediate casing 16 is disposed between the compressor casing 25 and the turbine casing 35 in the rotor axial direction Da. The compressor casing 25 and the turbine casing 35 are connected to each other via the intermediate casing 16. The compressor casing 25, the intermediate casing 16, and the turbine casing 35 are connected to each other to form a gas turbine casing 15. Compressed air Acom from the compressor 20 flows into the intermediate casing 16. The plurality of combustors 40 are provided in the intermediate casing 16.

Figure 2:
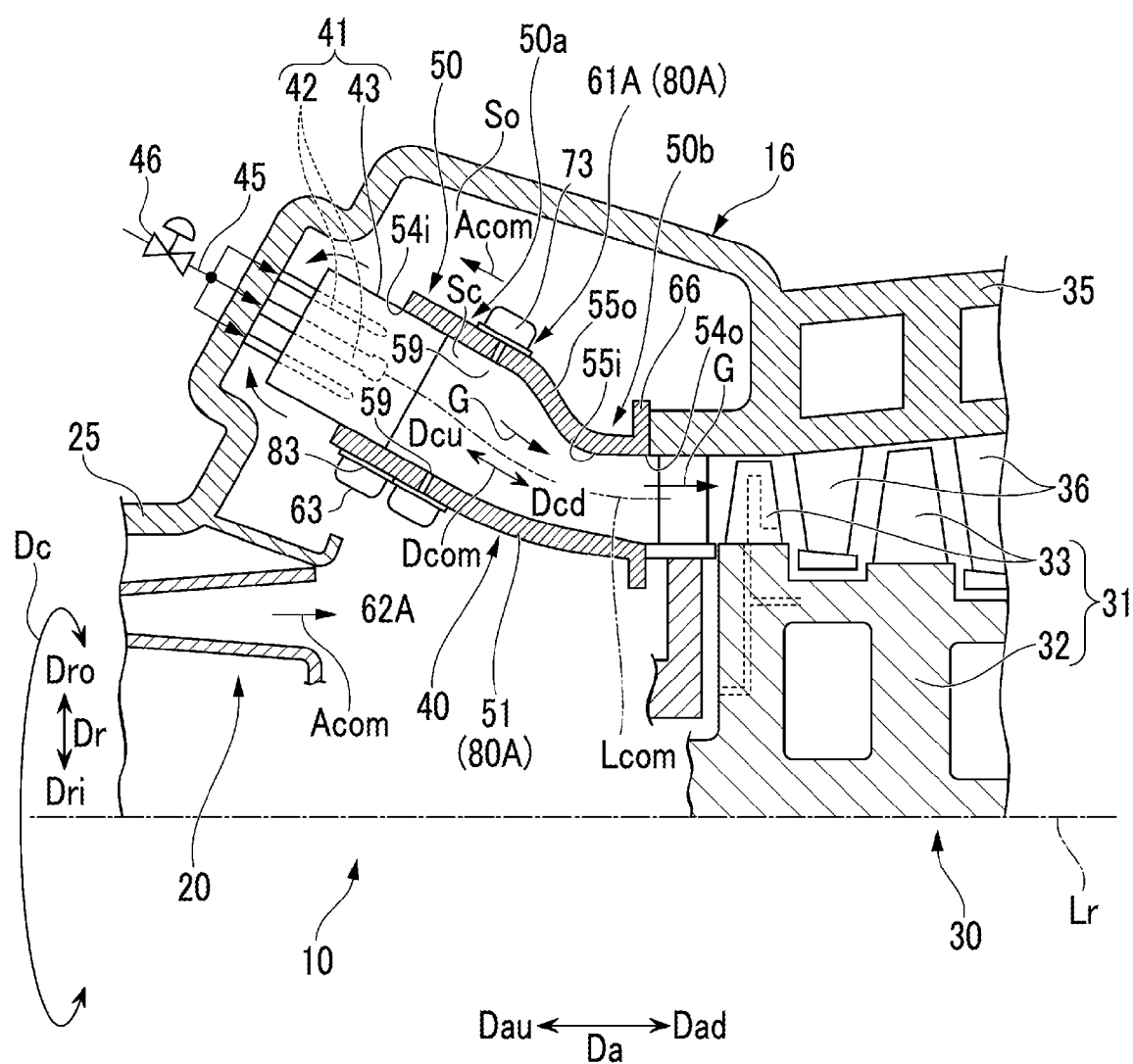
FIG. 2 is a cross-sectional view of a main part of the gas turbine in the first embodiment of the invention.

FIG. 2 is a cross-sectional view of a main part of the gas turbine in the first embodiment of the invention.

As illustrated in FIG. 2, the combustor 40 includes a combustion tube 50 that feeds the high-temperature and high-pressure combustion gas G into the combustion gas flow path of the turbine 30, and a fuel nozzle 41 that injects fuel F into the combustion tube 50, together with the compressed air Acom (refer to FIG. 1). The fuel nozzle 41 includes a plurality of burners 42 that inject the fuel F into the combustion tube 50, and a frame 43 that supports the plurality of burners 42. A fuel line 45 is connected to each of the burners 42. The fuel line 45 is provided with a fuel flow rate-regulating valve 46 that regulates the flow rate of the fuel F to be supplied to the plurality of burners 42. The combustion tube 50 of the combustor 40 is disposed inside the intermediate casing 16.

The combustion tube 50 includes an inner tube 50a and a transition piece 50b. The inner tube 50a forms a front half of the combustion tube 50 continuous to the fuel nozzle 41, and includes a tube assembly 80A. The transition piece 50b forms a rear half of the combustion tube 50, and is formed in, for example, a tubular shape having a cross section close to a rectangular shape. The transition piece 50b includes an attachment flange 66. The tube assembly 80A is formed of a tube 51 and an acoustic damping device 61A. Hereinafter, a direction in which a combustor axis Lcom extends is referred to as a combustor axial direction Dcom (hereinafter, simply referred to as an axial direction Dcom). In addition, one side in the axial direction Dcom is referred to as a combustor upstream side Dcu (hereinafter, simply referred to as an upstream side Dcu), and the other side in the axial direction Dcom is referred to as a combustor downstream side Dcd (hereinafter, simply referred to as a downstream side Dcd).

The tube 51 has a tubular shape around the combustor axis Lcom. The tube 51 includes an inlet opening 54i formed at an end on the upstream side Dcu; an outlet opening 54o formed at an end on the downstream side Dcd; an outer peripheral surface (outer surface) 55o facing an outer peripheral side; and an inner peripheral surface 55i facing an inner peripheral side. A space on the inner peripheral side of the tube 51 is a combustion space Sc in which the fuel F is combusted and through which the combustion gas G generated by the combustion flows. The attachment flange 66 extends from the outer peripheral surface 55o of the tube 51 to the outer peripheral side at an end on the downstream side Dcd of the tube 51. The tube 51 is attached to the turbine casing 35 via the attachment flange 66.

Figure 3:
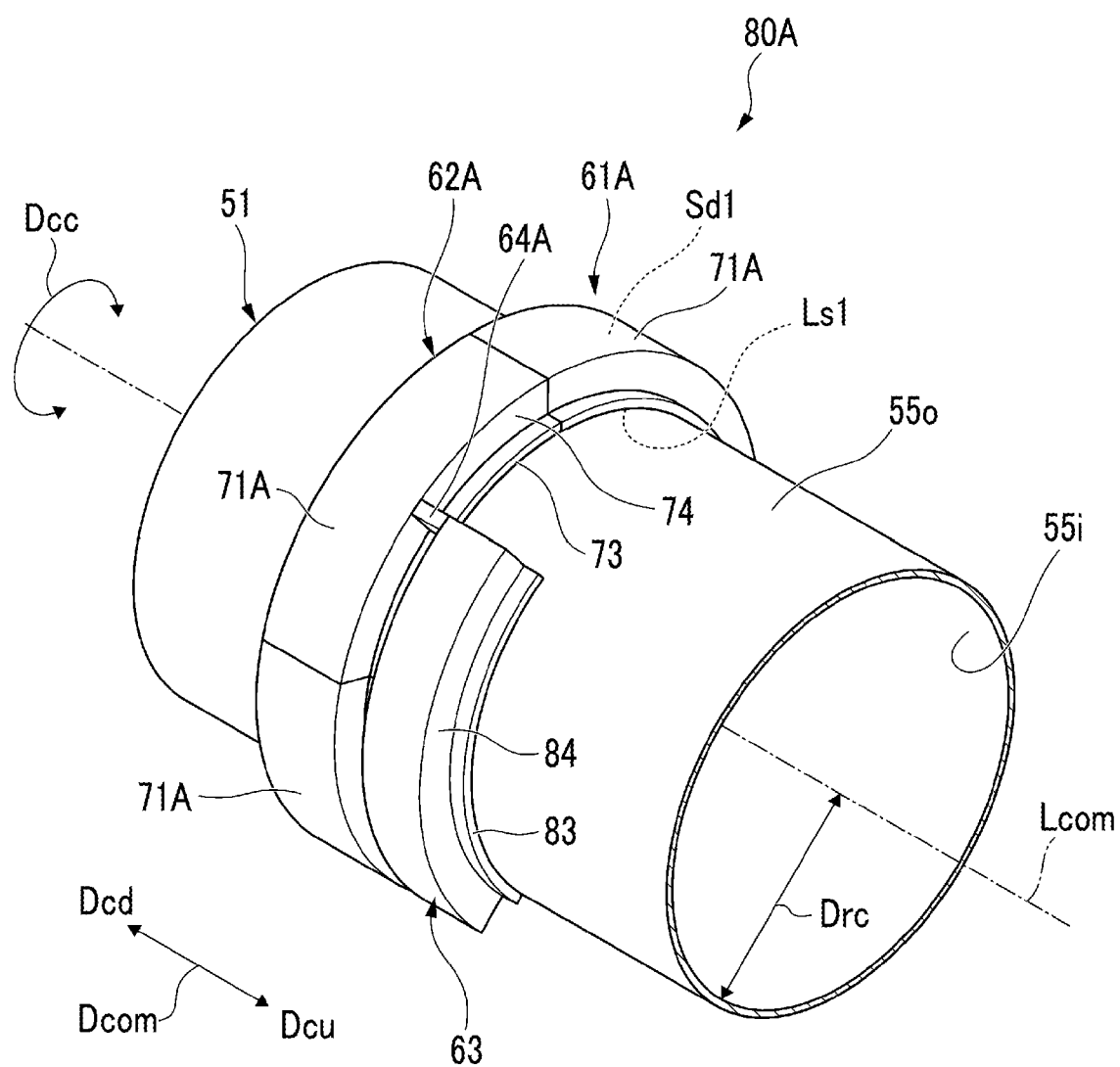
FIG. 3 is a perspective view of a tube assembly in the first embodiment of the invention.
Figure 4:
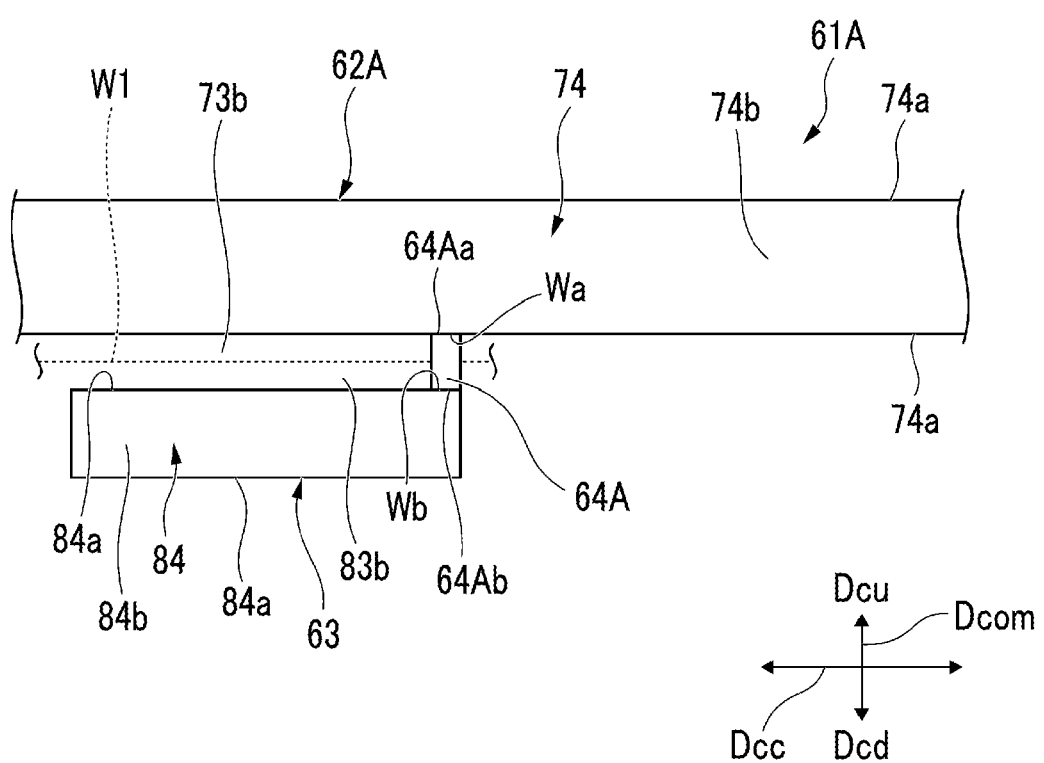
FIG. 4 is a developed view of an acoustic damper in the first embodiment of the invention as viewed from an outer peripheral side.
Figure 5:
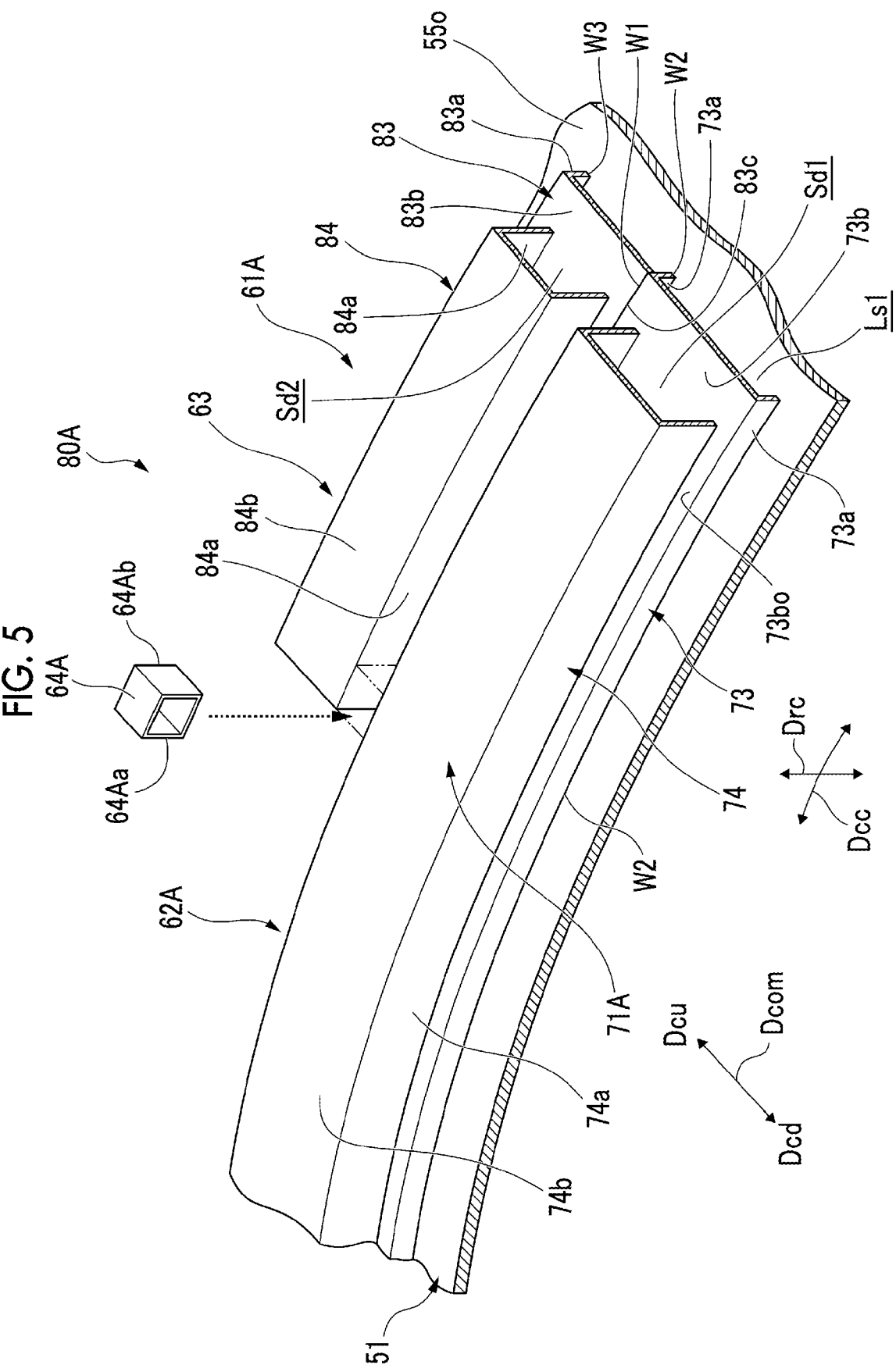
FIG. 5 is a perspective view illustrating a partial cross section of the tube assembly in the first embodiment of the invention.
Figure 6:
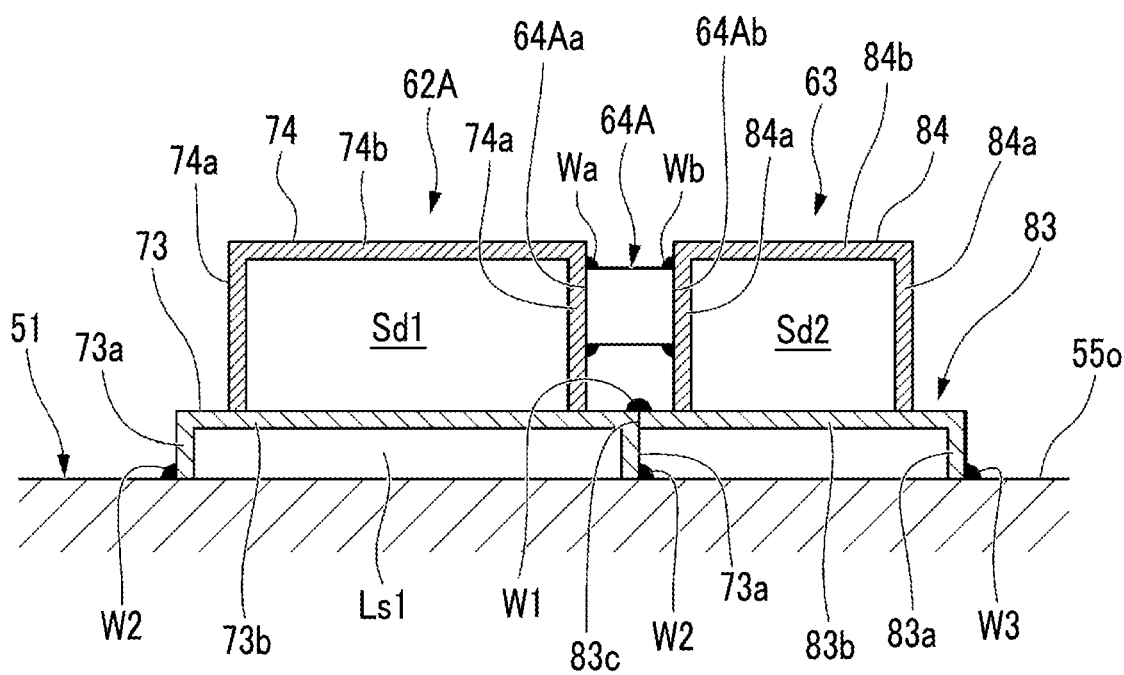
FIG. 6 is a cross-sectional view of the tube assembly in the first embodiment of the invention.

FIG. 3 is a perspective view of the tube assembly in the first embodiment of the invention. FIG. 4 is a developed view of an acoustic damper in the first embodiment of the invention as viewed from the outer peripheral side. FIG. 5 is a perspective view illustrating a partial cross section of the tube assembly in the first embodiment of the invention. FIG. 6 is a cross-sectional view of the tube assembly in the first embodiment of the invention.

As illustrated in FIGS. 2 to 6, the acoustic damping device 61A is attached to the outer peripheral surface 55o of the tube 51. The acoustic damping device 61A dampens combustion vibrations to be generated when the fuel F is combusted by the combustor 40. The acoustic damping device 61A includes a main body 62A, an extension portion 63, and a communication portion 64A.

The main body 62A is formed in an annular shape extending in a circumferential direction (hereinafter, simply referred to as a circumferential direction Dcc) around the combustor axis Lcom that is a central axis of the tube 51. The main body 62A includes a main body acoustic liner (first acoustic liner) 73 and a main body acoustic damper (first acoustic damper) 74.

As illustrated in FIGS. 5 and 6, the main body acoustic liner 73 forms a main body liner space (first liner space) Ls1, together with a part of the outer peripheral surface 55o of the tube 51. The main body acoustic liner 73 includes two liner side walls 73a extending in the circumferential direction Dcc, and a liner upper wall 73b connecting the two liner side walls 73a to each other. In other words, the main body acoustic liner 73 is formed in a U shape that is open on an outer peripheral surface 55o side of the tube 51 in a cross-sectional view including the combustor axis Lcom (refer to FIG. 2). The main body acoustic liner 73 illustrated as an example in the embodiment has a flat shape along the outer peripheral surface 55o of the tube 51. More specifically, the main body acoustic liner 73 is formed such that the dimension of the main body acoustic liner 73 in the axial direction Dcom is longer than the dimension of the main body acoustic liner 73 in a radial direction (hereinafter, simply referred to as a radial direction Drc) of the tube 51 in a cross-sectional view including the combustor axis Lcom.

The main body liner space Ls1 communicates with the combustion space Sc formed inside the tube 51, through a plurality of holes 59 (refer to FIG. 2) formed in the tube 51. The main body acoustic liner 73 mainly dampens combustion vibrations in a high frequency band among combustion vibrations.

The main body acoustic damper 74 is provided on an outer surface 73bo of the liner upper wall 73b of the main body acoustic liner 73. The main body acoustic damper 74 forms a main body acoustic damper space (first damper space) Sd1, together with a part of the liner upper wall 73b of the main body acoustic liner 73. The main body acoustic damper 74 includes two damper side walls (edges) 74a extending in the circumferential direction Dcc; a damper upper wall 74b connecting the two damper side walls 74a to each other; and an internal wall (not illustrated) forming an acoustic pipe in the main body acoustic damper space Sd1, the acoustic pipe having a length corresponding to a frequency band to be dampened.

The main body acoustic damper 74 is smaller than the main body acoustic liner 73 in the axial direction Dcom. Then, the two damper side walls 74a of the main body acoustic damper 74 are disposed inside the two liner side walls 73a of the main body acoustic liner 73 in a width direction of the main body acoustic liner 73. Namely, on a side close to the extension portion 63 in the axial direction Dcom, the liner side wall 73a of the main body acoustic liner 73 is disposed closer to the extension portion 63 than the damper side wall 74a of the main body acoustic damper 74. In the embodiment, the dimension of the main body acoustic damper 74 is larger than the dimension of the main body acoustic liner 73 in the radial direction Drc.

The main body acoustic damper 74 mainly dampens combustion vibrations in a low frequency band among combustion vibrations. The main body acoustic damper 74 illustrated as an example in the first embodiment includes a plurality of types of acoustic pipes in the main body acoustic damper space Sd1 for the purpose of dampening combustion vibrations in different frequency bands. The acoustic pipes individually communicate with the combustion space Sc through a passage portion (not illustrated) passing through the inside of the main body acoustic liner 73.

Figure 7:
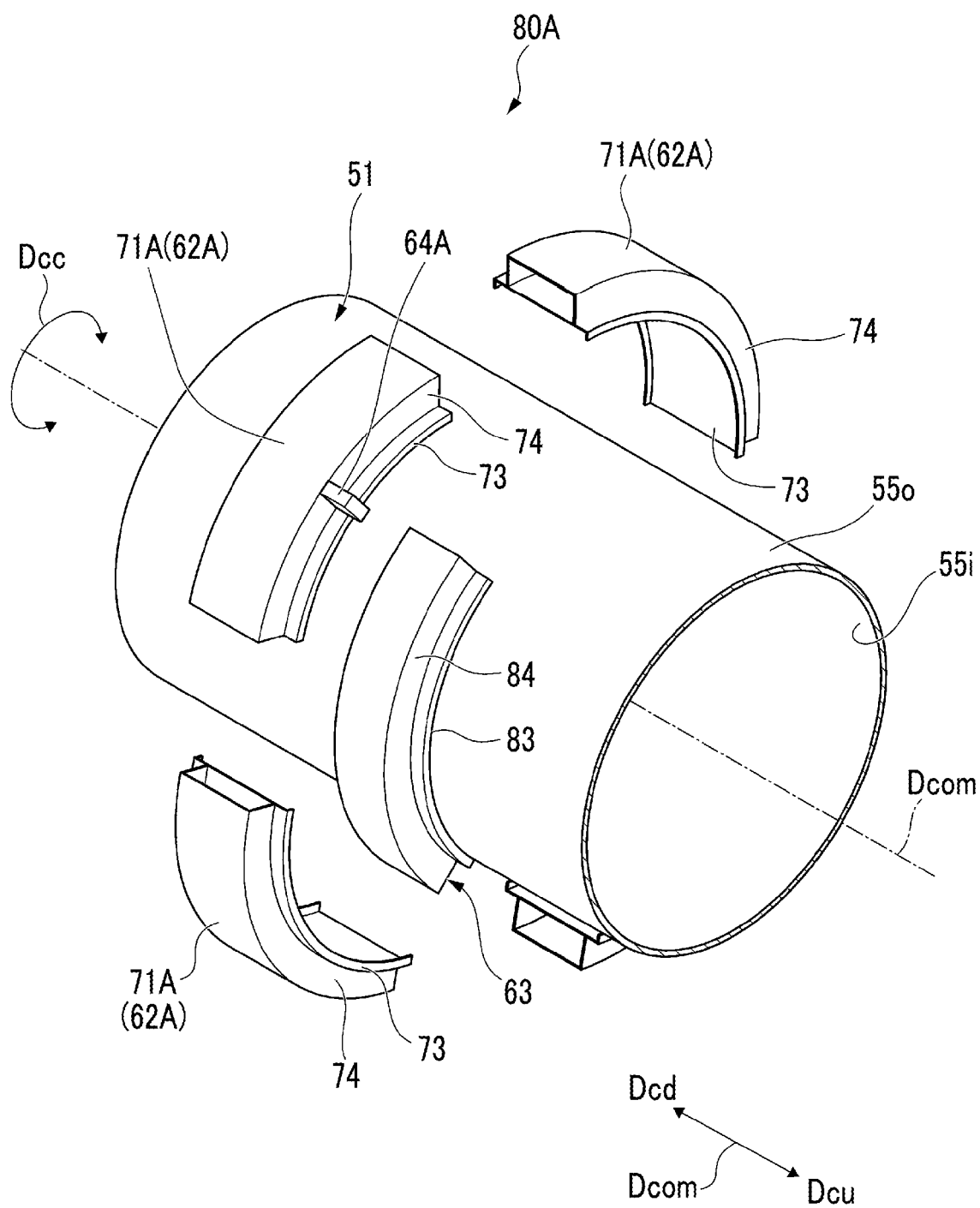
FIG. 7 is an exploded perspective view of the tube assembly in the first embodiment of the invention.

FIG. 7 is an exploded perspective view of the tube assembly in the first embodiment of the invention.

As illustrated in FIGS. 3 and 7, the main body 62A described above includes a plurality of main body damping units (first damping unit) 71A. The plurality of main body damping units 71A are to be assembled into a unit (subassembly) in advance before the work of attaching the main body 62A to the tube 51. The plurality of main body damping units 71A are to be fixed to the tube 51 via welding, and the main body damping units 71A adjacent to each other in the circumferential direction Dcc are to be joined to each other with an additional component (not illustrated), or the like. Each of the main body damping units 71A includes the main body acoustic liner 73 and the main body acoustic damper 74 that are described above.

As illustrated in FIGS. 2 to 7, similarly to the main body 62A, the extension portion 63 is attached to the outer peripheral surface 55o of the tube 51. The extension portion 63 of the embodiment is disposed on the upstream side Dcu of the main body 62A. The extension portion 63 extends in the circumferential direction Dcc. The extension portion 63 is formed in an arc shape extending parallel to the main body 62A. The extension portion 63 includes a base portion 83 and an extension portion acoustic damper (second acoustic damper) 84. In the first embodiment, the extension portion 63 corresponds to a second damping unit of the invention.

The base portion 83 is attached to the outer peripheral surface 55o of the tube 51. The base portion 83 includes a base portion side wall 83a (refer to FIG. 5) extending in the circumferential direction Dcc, and a base portion upper wall 83b extending from the base portion side wall 83a toward a main body 62A side in the axial direction Dcom. In the first embodiment, an edge 83c of the base portion 83 on a side close to the main body 62A in the axial direction Dcom is fixed to the main body acoustic liner 73 via a weld portion W1. Namely, the main body acoustic liner 73 and the base portion 83 are disposed adjacent to each other. The weld portion W1 formed between the main body acoustic liner 73 and the base portion 83 extends in the circumferential direction Dcc.

The extension portion acoustic damper 84 forms an extension portion damper space (second damper space) Sd2 disposed apart from the main body acoustic damper 74. The extension portion acoustic damper 84 of the first embodiment is disposed apart from the main body acoustic damper 74 in the axial direction Dcom. More specifically, the extension portion acoustic damper 84 is disposed on the upstream side Dcu away from the main body acoustic damper 74.

The extension portion acoustic damper 84 forms the extension damper space Sd2, together with a part of the base portion upper wall 83b. The extension portion acoustic damper 84 includes two damper side walls (edges) 84a extending in the circumferential direction Dcc; a damper upper wall 84b connecting the two damper side walls 84a to each other; and an internal wall (not illustrated) forming an acoustic pipe in the extension damper space Sd2, the acoustic pipe having a length corresponding to a frequency to be dampened. The extension damper space Sd2 (specifically, acoustic pipe) communicates with the combustion space Sc on the inner peripheral side of the tube 51 through the communication portion 64A and the main body 62A.

The extension portion acoustic damper 84 is smaller than the base portion 83 in the axial direction Dcom. Then, the two damper side walls 84a of the extension portion acoustic damper 84 are disposed inside the edge 83c of the base portion 83 and the base portion side wall 83a in a width direction of the base portion 83. Namely, on the side close to the main body 62A in the axial direction Dcom, the edge 83c of the base portion 83 is disposed closer to the main body 62A than the damper side wall 84a of the extension portion acoustic damper 84. In the embodiment, the dimension of the extension portion acoustic damper 84 is larger than the dimension of the base portion 83 in the radial direction Drc.

The extension portion acoustic damper 84 in the embodiment has the same height dimension as that of the main body acoustic damper 74 in the radial direction Drc. The base portion 83 has the same height dimension as that of the main body acoustic liner 73 in the radial direction Drc. In other words, the extension portion acoustic damper 84 is disposed on the base portion 83, so that the extension portion acoustic damper 84 is disposed at the same position as that of the main body acoustic damper 74 in the radial direction Drc. Accordingly, the damper side wall 84a of the extension portion acoustic damper 84 which faces the main body 62A side and the damper side wall 74a of the main body acoustic damper 74 which faces an extension portion 63 side are disposed to face each other in the axial direction Dcom.

The main body damper space Sd1 and the extension portion damper space Sd2 communicate with each other through the communication portion 64A. The communication portion 64A illustrated as an example in the embodiment is formed in a tubular shape extending in the axial direction Dcom. The communication portion 64A is disposed at a position farther outward from the outer peripheral surface 55o of the tube 51 in the radial direction Drc than the weld portion W1 formed between the main body 62A and the extension portion 63.

The weld portion W1 formed between the main body 62A and the extension portion 63 described above fixes the edge 83c of the base portion 83 to the main body acoustic liner 73. The weld portion W1 extends in the circumferential direction Dcc. The communication portion 64A is disposed to intersect the weld portion W1 when viewed in the radial direction around the combustor axis Lcom.

"Method for Producing Tube Assembly"

The acoustic damping device 61A, the tube assembly 80A, the combustor 40, and the gas turbine 10 in the first embodiment have the above-described configurations. Next, a method for producing the tube assembly 80A in the first embodiment will be described with reference to the drawings.

Figure 8:
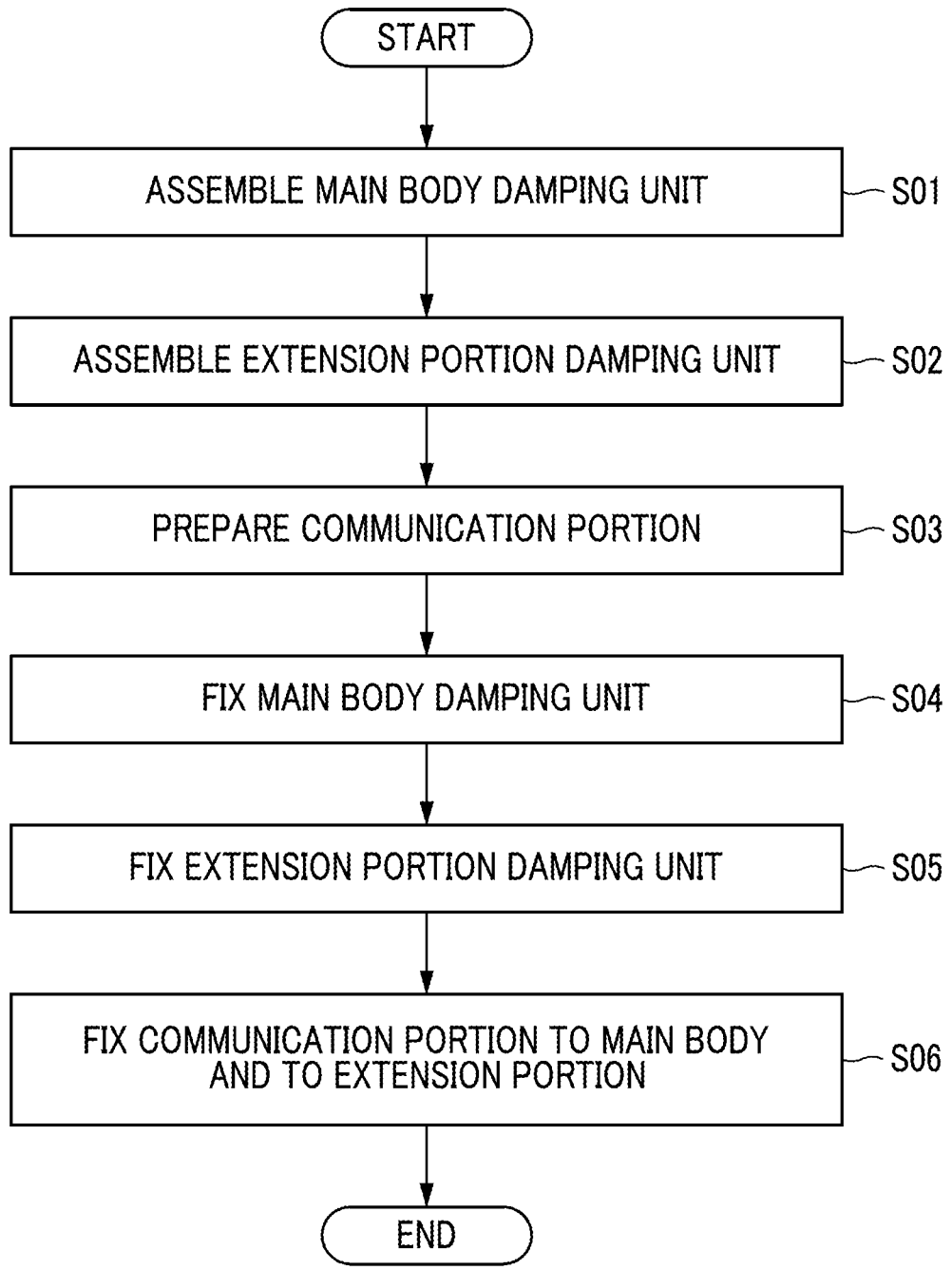
FIG. 8 is a flowchart of a method for producing a tube assembly in the first embodiment of the invention.

FIG. 8 is a flowchart of the method for producing a tube assembly in the first embodiment of the invention.

As illustrated in FIG. 8, in the method for producing the tube assembly 80A in the first embodiment, first, a step of assembling the main body damping unit 71A forming the main body 62A (step S01), a step of assembling the extension portion 63 (damping unit of the extension portion) (step S02), and a step of preparing the communication portion 64A (step S03) are to be performed.

Here, the order of executing the step of assembling the main body damping unit 71A (step S01), the step of assembling the extension portion 63 (step S02), and the step of preparing the communication portion 64A (step S03) is not limited to the order illustrated in FIG. 8. For example, the step of assembling the main body damping unit 71A (step S01), the step of assembling the extension portion 63 (step S02), and the step of preparing the communication portion 64A (step S03) may be simultaneously executed in parallel.

In the step of assembling the main body damping unit 71A (step S01) and in the step of assembling the extension portion 63 (step S02), the main body damping unit 71A and the extension portion 63 are to be assembled, for example, via welding and sequentially joining a plurality of metal materials prepared in advance. In the step of assembling the main body damping unit 71A (step S01), a plurality of the main body damping units 71A are to be assembled. In the step of preparing the communication portion 64A (step S03), for example, a process such as cutting a tubular metal member to a required length is to be performed. The number of the main body damping units 71A is not limited to 4 as long as the number thereof is 2 or more.

Next, in the method for producing the tube assembly 80A, a step of fixing the main body damping unit 71A to the outer peripheral surface 55o of the tube 51 via welding (step S04) and a step of fixing the extension portion 63 to the outer peripheral surface 55o of the tube 51 via welding (step S05) are to be performed.

In the step of fixing the main body damping unit 71A to the outer peripheral surface 55o of the tube 51 via welding (step S04), the plurality of main body damping units 71A are to be disposed in series in the circumferential direction Dcc, and inner edges of each of the main body acoustic liners 73 in the radial direction Drc and the tube 51 are to be fixed to each other via welding. Accordingly, a weld portion W2 (refer to FIGS. 5 and 6) extending in the circumferential direction Dcc is to be formed between the main body acoustic liner 73 and the outer peripheral surface 55o of the tube 51. In the first embodiment, after the plurality of main body damping units 71A are fixed to the tube 51, additional components (not illustrated) are to be attached to the main body damping units 71A via welding, or the like to complete the main body 62A. A passage portion (not illustrated) through which the extension portion damper space Sd2 of the extension portion 63 and the combustion space Sc communicate with each other is formed in one of the plurality of main body damping units 71A.

In the step of fixing the extension portion 63 to the outer peripheral surface 55o of the tube 51 via welding (step S05), the extension portion 63 is to be disposed along the main body damping unit 71A including the passage portion (not illustrated) through which the extension portion damper space Sd2 and the combustion space Sc communicate with each other, and the base portion 83 is to be fixed to the outer peripheral surface 55o of the tube 51 and to the main body acoustic liner 73 of the main body 62A via welding. Accordingly, weld portions W1 and W3 (refer to FIGS. 5 and 6) extending in the circumferential direction Dcc are to be formed between the base portion 83 and the main body acoustic liner 73.

Thereafter, in the method for producing the tube assembly 80A, a step of fixing the communication portion 64A to the main body 62A and to the extension portion 63 (step S06) is to be performed, and a series of the production steps are to be finished (end). In the step of fixing the communication portion 64A to the main body 62A and to the extension portion 63 (step S06), the communication portion 64A is to be disposed across the weld portion W1 formed in step S05 and extending in the circumferential direction Dcc.

In the step of fixing the communication portion 64A to the main body 62A and to the extension portion 63 (step S06), further, a first end portion 64Aa of the communication portion 64A is to be fixed to the main body acoustic damper 74 via welding, and a second end portion 64Ab of the communication portion 64A is to be fixed to the extension portion acoustic damper 84 via welding. Accordingly, a weld portion Wa is to be formed around the first end portion 64Aa of the communication portion 64A, and a weld portion Wb is to be formed around the communication portion 64B (refer to FIG. 6). In the first embodiment, the first end portion 64Aa of the communication portion 64A is to be fixed to the damper side wall 74a via welding and the second end portion 64Ab of the communication portion 64A is to be fixed to the damper side wall 84a via welding such that the communication portion 64A crosses between the main body acoustic damper 74 and the extension portion acoustic damper 84 at the shortest distance. Through-holes (not illustrated) are formed in the damper side wall 74a and the damper side wall 84a at locations at which the communication portion 64A is to be fixed. Accordingly, the main body damper space Sd1 and the extension portion damper space Sd2 communicate with each other through an internal space of the communication portion 64A. The communication portion 64A may be temporarily fixed and then permanently welded.

Effects of First Embodiment

According to the first embodiment described above, the main body acoustic damper 74 and the extension portion acoustic damper 84 are disposed away from each other in the axial direction Dcom. For this reason, when the work of fixing the extension portion 63 to the main body damping unit 71A of the tube 51 via the weld portion W1 is performed, the weld portion W1 can be easily formed by using a gap between the main body acoustic damper 74 and the extension portion acoustic damper 84. For this reason, even after each of the main body damping unit 71A and the extension portion 63 is assembled, the main body damping unit 71A and the extension portion 63 can be easily installed.

In the first embodiment described above, the communication portion 64A is further provided at a position farther from the outer peripheral surface 55o of the tube 51 than the weld portion W1. For this reason, after the weld portion W1 is formed, the communication portion 64A can be disposed across the weld portion W1, and the extension portion damper space Sd2 of the extension portion acoustic damper 84 can communicate with the main body damper space Sd1 of the main body acoustic damper 74. Therefore, the work of assembling the acoustic damping device 61A can be facilitated, and a burden on a worker can be reduced.

In the first embodiment described above, an edge of the main body acoustic liner 73 on the side close to the extension portion 63 is disposed at a position closer to the extension portion 63 than an edge of the main body acoustic damper 74 on the side close to the extension portion 63. For this reason, even when the main body 62A and the extension portion 63 are disposed close to each other, such as when the extension portion 63 is directly fixed to the main body acoustic liner 73 of the main body 62A via the weld portion W1, a space for the work of forming the weld portion W1 between the main body acoustic damper 74 and the extension portion acoustic damper 84 can be secured.

In the first embodiment described above, the extension portion 63 includes the base portion 83 to be attached to the outer peripheral surface 55o of the tube 51. For this reason, the position of the main body acoustic damper 74 and the position of the extension portion acoustic damper 84 can be aligned in a direction away from the outer peripheral surface 55o of the tube 51 (radial direction Drc). Therefore, the work of fixing the communication portion 64A to the main body acoustic damper 74 and to the extension portion acoustic damper 84 can be easily performed.

Modification Example of First Embodiment

Figure 9:
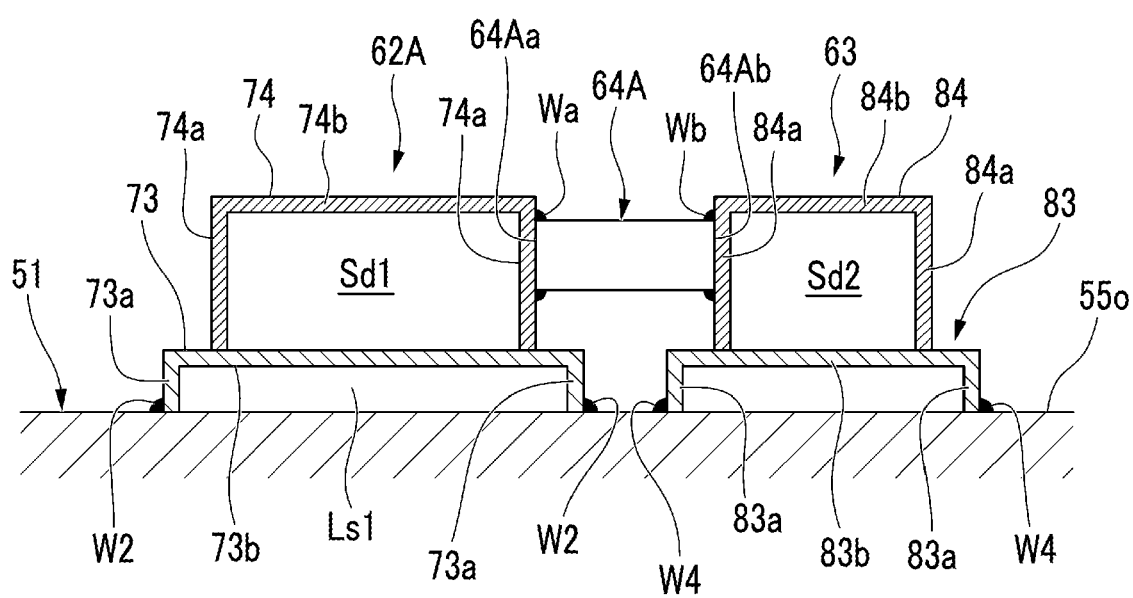
FIG. 9 is a cross-sectional view of a tube assembly corresponding to FIG. 6 in a modification example of the first embodiment of the invention.

FIG. 9 is a cross-sectional view of a tube assembly corresponding to FIG. 6 in a modification example of the first embodiment of the invention.

In the first embodiment described above, the weld portion W1 that fixes the edge 83c of the base portion 83 to the main body acoustic liner 73 has been provided as an example of the weld portion W1 extending in the circumferential direction Dcc. However, as illustrated in FIG. 9, when the main body acoustic liner 73 and the base portion 83 are slightly separated from each other in the axial direction Dcom, the weld portion extending in the circumferential direction Dcc may be the weld portion W2 that fixes the main body acoustic liner 73 to the outer peripheral surface 55o of the tube 51.

Further, when the main body acoustic liner 73 and the base portion 83 are slightly separated from each other in the axial direction Dcom, the base portion 83 includes two base portion side walls 83a. The weld portion extending in the circumferential direction Dcc may be a weld portion W4 that fixes the base portion side wall 83a of the two base portion side walls 83a on the side close to the main body 62A to the outer peripheral surface 55o of the tube 51.

Second Embodiment

Next, a second embodiment of the invention will be described with reference to the drawings. The second embodiment differs from the first embodiment described above in that main body damper spaces of adjacent main body damping units 71 of the main body 62A communicate with each other through a communication portion instead of providing the extension portion 63. For this reason, the same portions as those in the first embodiment described above will be described with the same reference signs. In addition, a detailed description of duplicated configurations from the first embodiment will be omitted.

Figure 10:
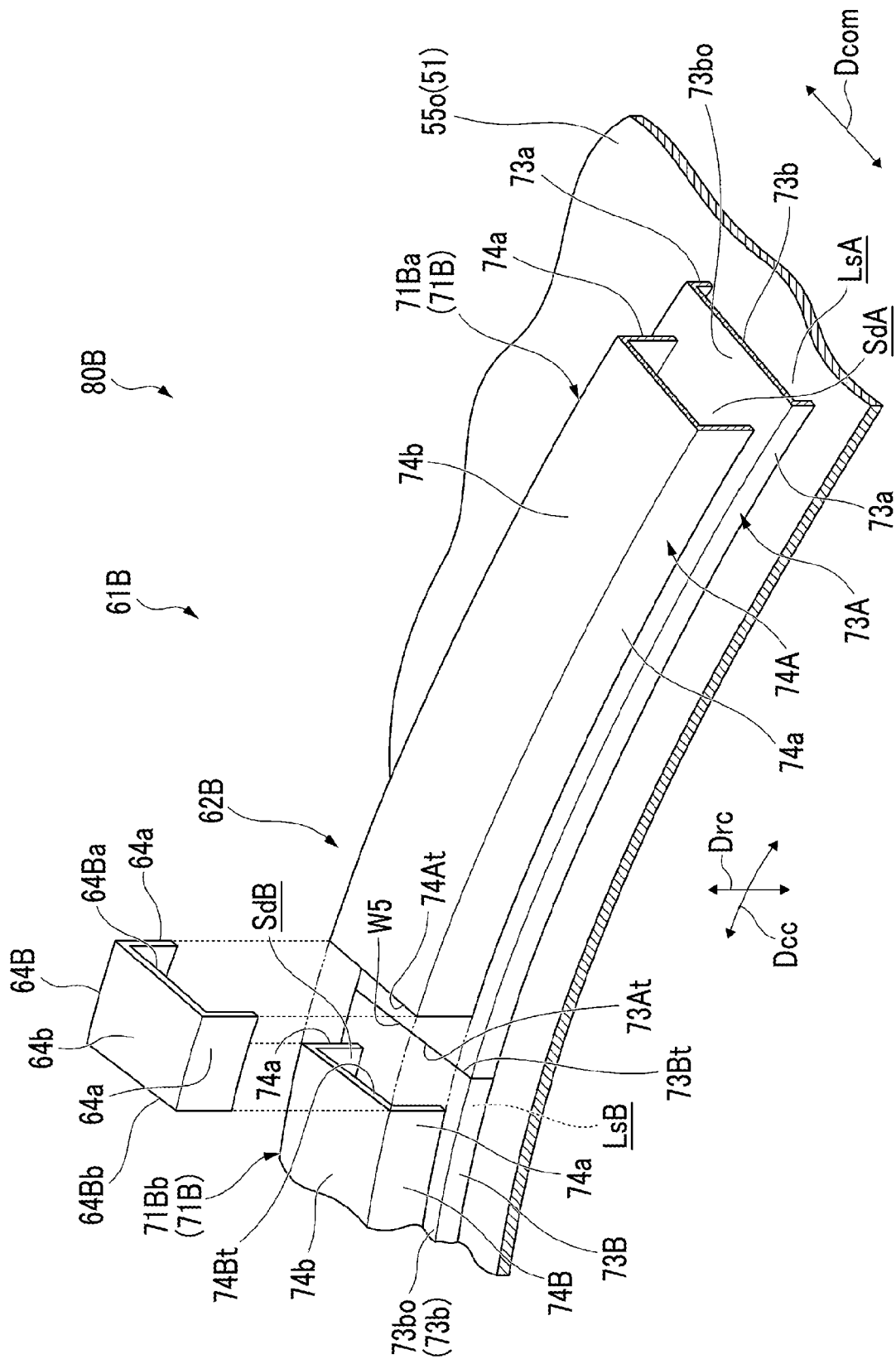
FIG. 10 is a perspective view corresponding to FIG. 5 in a second embodiment of the invention.

FIG. 10 is a perspective view corresponding to FIG. 5 in the second embodiment of the invention.

Similarly to the tube assembly 80A of the first embodiment described above, a tube assembly 80B of the second embodiment forms a part of the combustor 40 of the gas turbine 10. As illustrated in FIG. 10, the tube assembly 80B includes the tube 51 and an acoustic damping device 61B. The acoustic damping device 61B dampens combustion vibrations to be generated when the fuel F is combusted by the combustor 40. The acoustic damping device 61B includes a main body 62B.

The main body 62B includes a plurality of main body damping units 71B and a communication portion 64B. In the second embodiment, three main body damping units 71B, specifically, a first main body damping unit 71Ba, a second main body damping unit 71Bb, and a third main body damping unit (not illustrated) are provided. When the first main body damping unit 71Ba is assumed to be the first damping unit of the invention, the second main body damping unit 71Bb and the third main body damping unit (not illustrated) that are adjacent to the first main body damping unit 71Ba correspond to the second damping unit of the invention.

In the following description of the second embodiment, a case where the first damping unit is the first main body damping unit 71Ba and the second damping unit is the second main body damping unit 71B*b* will be described as one example. A description of the third main body damping unit (not illustrated) as the second damping unit will be omitted. In the following description, the first main body damping unit 71B*a*, the second main body damping unit 71B*b*, and the third main body damping unit (not illustrated) may be simply called the main body damping unit 71B unless there is a need for distinction.

The main body damping unit 71B is to be assembled into a unit in advance (sub-assembly) before the work of attaching the main body 62B to the tube 51. The main body damping unit 71B is to be fixed to the tube 51 via welding.

The first main body damping unit 71B*a* includes a first acoustic liner 73A and a first acoustic damper 74A. The second main body damping unit 71B*b* includes a second acoustic liner 73B and a second acoustic damper 74B.

The first acoustic liner 73A forms a first liner space (first liner space) LsA, together with a part of the outer peripheral surface 55*o* of the tube 51. The first acoustic liner 73A includes two liner side walls 73*a* extending in the circumferential direction Dcc, and the liner upper wall 73*b* connecting the two liner side walls 73*a* to each other.

The second acoustic liner 73B is formed similarly to the first acoustic liner 73A. The second acoustic liner 73B forms a second liner space (second liner space) LsB, together with a part of the outer peripheral surface 55*o* of the tube 51. Similarly to the first acoustic liner 73A, the second acoustic liner 73B also includes the liner upper wall 73*b* connecting two liner side walls 73*a* to each other.

The first acoustic liner 73A and the second acoustic liner 73B are formed in a U shape that is open on the outer peripheral surface 55*o* side of the tube 51 in a cross-sectional view including the combustor axis Lcom. The first acoustic liner 73A and the second acoustic liner 73B have a flat shape along the outer peripheral surface 55*o* of the tube 51. The first acoustic liner 73A and the second acoustic liner 73B are formed such that the dimension thereof in the axial direction Dcom is longer than the dimension thereof in the radial direction Drc in a cross-sectional view including the combustor axis Lcom.

The first liner space LsA and the second liner space LsB communicate with the combustion space Sc formed inside the tube 51, through a plurality of the holes 59 (refer to FIG. 2) formed in the tube 51. The first acoustic liner 73A and the second acoustic liner 73B mainly dampen combustion vibrations in a high frequency band among combustion vibrations.

The first acoustic damper 74A is provided on the outer surface 73*bo* of the liner upper wall 73*b* of the first acoustic liner 73A. The first acoustic damper 74A forms a first acoustic damper space (first damper space) SdA, together with a part of the liner upper wall 73*b* of the first acoustic liner 73A.

The second acoustic damper 74B is provided on the outer surface 73*bo* of the liner upper wall 73*b* of the second acoustic liner 73B. The second acoustic damper 74B forms a second acoustic damper space (second damper space) SdB, together with a part of the liner upper wall 73*b* of the second acoustic liner 73B.

Similarly to the main body acoustic damper 74 of the first embodiment, each of the first acoustic damper 74A and the second acoustic damper 74B includes two damper side walls (edges) 74*a* extending in the circumferential direction; the damper upper wall 74*b* connecting the two damper side walls 74*a* to each other; and an internal wall (not illustrated) forming an acoustic pipe having a length corresponding to a frequency band to be dampened.

The first acoustic damper 74A is formed to be smaller than the first acoustic liner 73A in the circumferential direction Dcc. An end portion (edge) 74A*t* of the first acoustic damper 74A is disposed inside an end portion (edge) 73A*t* of the first acoustic liner 73A in a length direction of the first acoustic liner 73A. In other words, in the circumferential direction Dcc, the end portion 73A*t* of the first acoustic liner 73A on a side close to the second acoustic liner 73B is disposed closer to the second acoustic liner 73B than the end portion 74A*t* of the first acoustic damper 74A on the side close to the second acoustic liner 73B.

Similarly to the first acoustic damper 74A, the second acoustic damper 74B is formed to be smaller than the second acoustic liner 73B in the circumferential direction Dcc. An end portion (edge) 74B*t* of the second acoustic damper 74B is disposed inside an end portion (edge) 73B*t* of the second acoustic liner 73B in a length direction of the second acoustic liner 73B. In other words, in the circumferential direction Dcc, the end portion 73B*t* of the second acoustic liner 73B on a side close to the first acoustic liner 73A is disposed closer to the first acoustic liner 73A than the end portion 74B*t* of the second acoustic damper 74B on the side close to the first acoustic liner 73A.

The first acoustic liner 73A of the first main body damping unit 71B*a* and the second acoustic liner 73B of the second main body damping unit 71B*b* are connected to each other via a weld portion W5. In the second embodiment, each of the end portion 73A*t* of the first acoustic liner 73A and the end portion 73B*t* of the second acoustic liner 73B in the circumferential direction Dcc extends in the axial direction Dcom when viewed from the outer peripheral side of the tube 51. Namely, the weld portion W5 to be formed between the first acoustic liner 73A and the second acoustic liner 73B also extends in the axial direction Dcom.

The first acoustic damper space SdA and the second acoustic damper space SdB communicate with each other through the communication portion 64B. The communication portion 64B illustrated as an example in the second embodiment extends in the circumferential direction Dcc. The communication portion 64B is disposed at a position farther outward from the outer peripheral surface 55*o* of the tube 51 in the radial direction Drc than the weld portion W5 formed between the first acoustic liner 73A and the second acoustic liner 73B. The communication portion 64B forms a communication passage through which the first acoustic damper space SdA and the second acoustic damper space SdB communicate with each other, together with a part of each upper surface of the liner upper wall 73*b* of the first acoustic liner 73A and the liner upper wall 73*b* of the second acoustic liner 73B.

The communication portion 64B is formed to have a U-shaped cross section including two side walls 64*a* and an upper wall 64*b* connecting the side walls 64*a* to each other. The communication portion 64B illustrated as an example in the second embodiment is formed like an extension of the first acoustic damper 74A and the second acoustic damper 74B in the circumferential direction Dcc. The communication portion 64B is fixed to the end portion 74A*t* of the first acoustic damper 74A, to the end portion 74B*t* of the second acoustic damper 74B, to the liner upper wall 73*b* of the first acoustic liner 73A, and to the liner upper wall 73*b* of the second acoustic liner 73B via welding. Similarly to the communication portion 64A of the first embodiment, the communication portion 64B may be formed in a tubular shape.

The first acoustic damper 74A, the second acoustic damper 74B, and the communication portion 64B described above form the main body acoustic damper 74 having the same configuration as that of the first embodiment.

"Method for Producing Tube Assembly"

The acoustic damping device 61B, the tube assembly 80B, the combustor 40, and the gas turbine 10 in the second embodiment have the above-described configurations. Next, a method for producing the tube assembly 80B in the second embodiment will be described with reference to the drawings.

Figure 11:
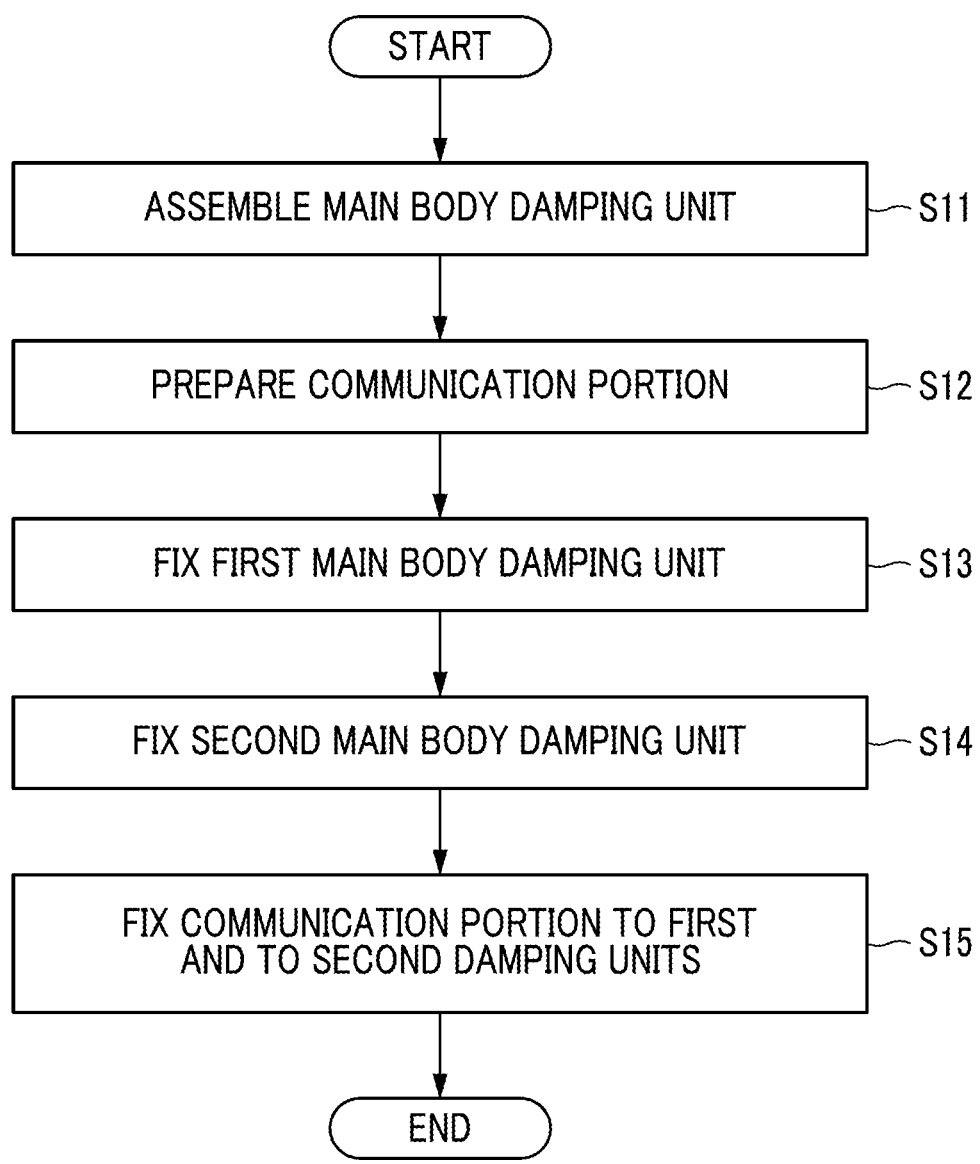
FIG. 11 is a flowchart of a method for producing a tube assembly in the second embodiment of the invention.

FIG. 11 is a flowchart of the method for producing a tube assembly in the second embodiment of the invention.

As illustrated in FIG. 11, in the method for producing the tube assembly 80B in the second embodiment, first, a step of assembling a plurality of the main body damping units 71B forming the main body 62B (step S11) and a step of preparing the communication portion 64B (step S12) are to be performed.

Here, the order of executing a step of assembling the main body damping unit 71B (step S11) and a step of preparing the communication portion 64A (step S12) is not limited to the order illustrated in FIG. 11. For example, the step of assembling the main body damping unit 71B (step S11) and the step of preparing the communication portion 64B (step S12) may be simultaneously executed in parallel.

In the step of assembling the main body damping unit 71B (step S11), similarly to steps S01 and S02 of the first embodiment, the main body damping unit 71B is to be assembled, for example, via welding and sequentially joining a plurality of metal materials prepared in advance. In the case of the second embodiment, in the step of assembling the main body damping unit 71B (step S11), each of the first main body damping unit 71B*a*, the second main body damping unit 71B*b*, and the third main body damping unit (not illustrated) is to be assembled.

In the step of preparing the communication portion 64B (step S12), for example, similarly to the main body damping unit 71B, the communication portion 64B is to be assembled, for example, via welding and sequentially joining a plurality of metal materials prepared in advance. The communication portion 64B may be prepared by cutting a long metal material to a predetermined length, or the like, the metal material being formed to have a U-shaped cross section in advance.

Next, in the method for producing the tube assembly 80B, a step of fixing the first main body damping unit 71B*a* to the outer peripheral surface 55*o* of the tube 51 via welding (step S13) and a step of fixing the second main body damping unit 71B*b* to the outer peripheral surface 55*o* of the tube 51 via welding (step S14) are to be performed.

In the step of fixing the first main body damping unit 71B*a* to the outer peripheral surface 55*o* of the tube via welding (step S13), the plurality of main body damping units 71B are to be disposed to extend in the circumferential direction Dcc, and inner edges of each of the first acoustic liners 73A in the radial direction Drc (in other words, inner edges of each of the liner side walls 73*a* in the radial direction Drc) and the tube 51 are to be fixed to each other via welding.

In the step of fixing the second main body damping unit 71B*b* to the outer peripheral surface 55*o* of the tube 51 via welding (step S14), the second main body damping unit 71B*b* is to be disposed to extend in the circumferential direction Dcc. In the step of fixing the second main body damping unit 71B*b* to the outer peripheral surface 55*o* of the tube 51 via welding (step S14), further, the second main body damping unit 71B*b* is to be disposed so as to be continuous to the first main body damping unit 71B*a* in the circumferential direction Dcc.

In the step of fixing the second main body damping unit 71B*b* to the outer peripheral surface 55*o* of the tube 51 via welding (step S14), further, inner edges of the second acoustic liner 73B in the radial direction Drc (in other words, inner edges of the liner side wall 73*a* in the radial direction Drc) and the tube 51 are to be fixed to each other via welding. In the step of fixing the second main body damping unit 71B*b* to the outer peripheral surface 55*o* of the tube 51 via welding (step S14), further, the end portion 73A*t* of the first acoustic liner 73A and the end portion 73B*t* of the second acoustic liner 73B are to be connected to each other via welding, the end portion 73A*t* and the end portion 73B*t* facing each other in the circumferential direction Dcc. Accordingly, the weld portion W5 extending in the axial direction Dcom is to be formed between the first acoustic liner 73A and the second acoustic liner 73B.

Thereafter, in the method for producing the tube assembly 80A, a step of fixing the communication portion 64B to the first main body damping unit 71B*a* and to the second main body damping unit 71B*b* (step S15) is to be performed, and a series of the production steps are to be finished (end). In the step of fixing the communication portion 64B to the first main body damping unit 71B*a* and to the second main body damping unit 71B*b* (step S15), the communication portion 64B is to be disposed across the weld portion W5 formed between the first main body damping unit 71B*a* and the second main body damping unit 71B*b* and extending in the axial direction Dcom.

In other words, in the step of fixing the communication portion 64B to the first main body damping unit 71B*a* and to the second main body damping unit 71B*b* (step S15), the communication portion 64B is to be disposed between the first acoustic damper 74A and the second acoustic damper 74B adjacent to each other in the circumferential direction Dcc. At that time, the communication portion 64B is to be disposed so as to be continuous to each of the first acoustic damper 74A and the second acoustic damper 74B in the circumferential direction Dcc.

In the step of fixing the communication portion 64B to the first main body damping unit 71B*a* and to the second main body damping unit 71B*b* (step S15), a first end portion 64B*a* of the communication portion 64B is to be fixed to the first acoustic damper 74A via welding, and a second end portion 64B*b* of the communication portion 64B is to be fixed to the second acoustic damper 74B via welding. Accordingly, the first acoustic damper space SdA and the second acoustic damper space SdB communicate with each other through an internal space of the communication portion 64B.

Only the step of welding and integrating the first main body damping unit 71B*a*, the second main body damping unit 71B*b*, and the communication portion 64B has been described; however, the same steps as the above-described steps are to be performed at each of locations at which the main body damping units 71B adjacent to each other in the circumferential direction are to be connected to each other. For example, when three main body damping units 71 are provided as in the second embodiment, acoustic damper spaces adjacent to each other in the circumferential direction Dcc communicate with each other through the same communication portion 64B as the one described above also at a location at which the first main body damping unit 71B*a* and the third main body damping unit (not illustrated) are to be connected to each other, and also at a location at which the second main body damping unit 71B*b* and the third main body damping unit (not illustrated) are to be connected to each other.

Effects of Second Embodiment

According to the second embodiment described above, the first acoustic damper 74A and the second acoustic damper 74B are disposed away from each other in the circumferential direction Dcc. For this reason, when the work of welding and fixing the first acoustic liner 73A and the second acoustic liner 73B is performed, the weld portion W5 can be easily formed by using a gap between the first acoustic damper 74A and the second acoustic damper 74B. For this reason, even after each of the first main body damping unit 71B*a* and the second main body damping unit 71B*b* is assembled, the first main body damping unit 71B*a* and the second main body damping unit 71B*b* can be easily installed on the outer peripheral surface 55*o* of the tube 51.

In the second embodiment described above, the communication portion 64B is further provided which is disposed at a position farther from the outer peripheral surface 55*o* of the tube 51 than the weld portion W5. For this reason, after the weld portion W5 is formed, the communication portion 64B can be disposed across the weld portion W5, and the second acoustic damper space SdB of the second acoustic damper 74B can communicate with the first acoustic damper space SdA of the first acoustic damper 74A. Therefore, the work of assembling the acoustic damping device 61B can be facilitated, and a burden on a worker can be reduced.

In the second embodiment described above, the end portion 73A*t* of the first acoustic liner 73A is disposed at a position closer to the second main body damping unit 71B*b* than the end portion 74At of the first acoustic damper 74A on a side close to the second main body damping unit 71Bb. For this reason, even when the second main body damping unit 71B*b* is directly fixed to the first acoustic liner 73A of the first main body damping unit 71B*a* via the weld portion W5, and the first main body damping unit 71B*a* and the second main body damping unit 71B*b* are disposed close to each other, a space for the work of forming the weld portion W5 between the first acoustic damper 74A and the second acoustic damper 74B can be secured.

According to the method for producing the tube assembly 80B in the second embodiment described above, when the first main body damping unit 71B*a* and the second main body damping unit 71B*b* are individually assembled, and then each of the first main body damping unit 71B*a* and the second main body damping unit 71B*b* is fixed via welding, the first acoustic damper 74A and the second acoustic damper 74B can be disposed away from each other. For this reason, the weld portion W5 to be disposed between the first main body damping unit 71B*a* and the second main body damping unit 71B*b* can be easily formed. In addition, after the weld portion W5 is formed, the first acoustic damper 74A and the second acoustic damper 74B can communicate with each other through the communication portion 64B. Therefore, the tube assembly 80B can be easily produced.

Modification Example of Each Embodiment

The invention is not limited to the configurations of the above-described embodiments and the modification example, and changes can be made to the design without departing from the concept of the invention.

For example, in the first embodiment described above, the case where the extension portion 63 includes the base portion 83 has been described, but the base portion 83 may not be provided. In addition, similarly to the main body acoustic liner 73, the base portion 83 may form a base portion liner space (second liner space, not illustrated) communicating with the combustion space Sc (internal space) on the inner peripheral side of the tube 51.

In each of the above-described embodiments, the case where the combustion tube 50 of the combustor 40 of the gas turbine 10 is an object to which the acoustic damping device 61A or 61B is to be attached has been described as an example. However, the object to which the acoustic damping device 61A or 61B is to be attached may be objects other than the combustion tube 50 of the combustor 40 of the gas turbine 10.

Figure 12:
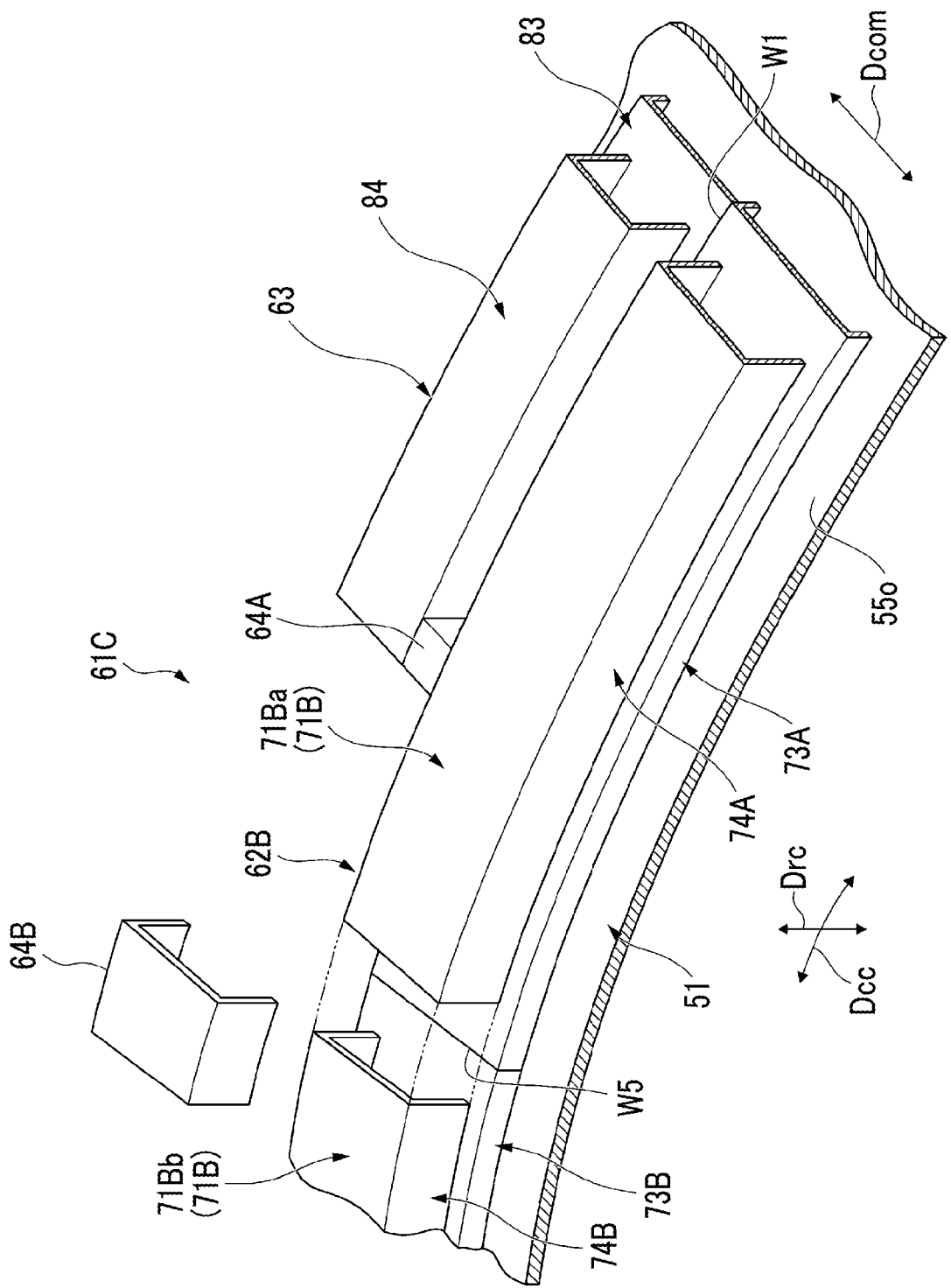
FIG. 12 is a perspective view corresponding to FIGS. 5 and 10 in a modification example of each embodiment of the invention.

FIG. 12 is a perspective view corresponding to FIGS. 5 and 10 in a modification example of each embodiment of the invention.

In the second embodiment described above, the case where the extension portion 63 is not provided has been described. However, as in an acoustic damping device 61C illustrated in FIG. 12, both the main body 62B of the second embodiment and the extension portion 63 of the first embodiment may be provided. In this case, the first acoustic damper 74A of the first main body damping unit 71B*a* and the extension portion acoustic damper 84 of the extension portion 63 that are adjacent to each other in the axial direction Dcom are to be connected to each other by the communication portion 64A. Further, the first acoustic damper 74A and the second acoustic damper 74B that are adjacent to each other in the circumferential direction Dcc are to be connected to each other by the communication portion 64B.

INDUSTRIAL APPLICABILITY

Assembling can be easily performed according to the acoustic damping device, the tube assembly, the combustor, the gas turbine, and the method for producing a tube assembly.

REFERENCE SIGNS LIST

10: Gas turbine
11: Gas turbine rotor
15: Gas turbine casing
16: Intermediate casing
20: Compressor
21: Compressor rotor
22: Rotor shaft
23: Rotor blade row
25: Compressor casing
26: Stator vane row
30: Turbine
31: Turbine rotor
32: Rotor shaft
33: Rotor blade row
35: Turbine casing
36: Stator vane row
40: Combustor
41: Fuel nozzle
42: Burner
43: Frame
45: Fuel line
46: Fuel flow rate-regulating valve
50: Combustion tube
51: Tube (object)
54*i*: Inlet opening 54*o*: Outlet opening
55*i*: Inner peripheral surface
55*o*: Outer peripheral surface (outer surface)
59: Hole
61A, 61B, 61C: Acoustic damping device
62A, 62B: Main body
63: Extension portion (second damping unit)
64*a*: Side wall
64A, 64B: Communication portion
64A*a*: First end portion
64A*b*: Second end portion
64*b*: Upper wall
64B*a*: First end portion
64B*b*: Second end portion
66: Attachment flange
71: Main body damping unit
71A: Main body damping unit (first damping unit)
71B: Main body damping unit
71B*a*: First main body damping unit (first damping unit)
71B*b*: Second main body damping unit (second damping unit)
73: Main body acoustic liner (first acoustic liner)
73*a*: Liner side wall
73A: First acoustic liner
73A*t*: End portion (edge)
73*b*: Liner upper wall
73B: Second acoustic liner
73B*o*: Outer surface
73B*t*: End portion (edge)
74: Main body acoustic damper (first acoustic damper)
74*a*: Damper side wall (edge)
74A: First acoustic damper
74A*t*: End portion (edge)
74*b*: Damper upper wall
74B: Second acoustic damper
74B*t*: End portion (edge)
80A, 80B: Tube assembly
83: Base portion
83*a*: Base portion side wall
83*b*: Base portion upper wall
83*c*: Edge
84: Extension portion acoustic damper (second acoustic damper)
84*a*: Damper side wall (edge)
84*b*: Damper upper wall

The invention claimed is:

1. An acoustic damping device comprising:
a first damping unit including
 a first acoustic liner to be attached to an outer surface of an object formed in a tubular shape to form a first liner space communicating with an internal space of the object, and
 a first acoustic damper to be provided on an outer surface of the first acoustic liner to form a first damper space communicating with the internal space of the object, the outer surface facing a side opposite the object;
a second damping unit that includes a second acoustic damper disposed away from the first acoustic damper and forming a second damper space and that is to be attached to the outer surface of the object;
a weld portion to be provided at least at a location between the first acoustic damper and the second acoustic damper to fix the second damping unit to the first acoustic liner or to the outer surface of the object; and
a communication portion to be disposed at a position farther from the outer surface of the object than the weld portion, the communication portion being formed in a tubular shape that extends along an axial direction in which a central axis of the object extends, a first end portion of the communication portion being fixed to the first acoustic damper via welding and a second end portion of the communication portion being fixed to the second acoustic damper via welding to thereby allow the first damper space and the second damper space to communicate with each other.

2. The acoustic damping device according to claim 1, wherein an edge of the first acoustic liner on a side close to the second damping unit is disposed closer to the second damping unit than an edge of the first acoustic damper on the side close to the second damping unit.

3. The acoustic damping device according to claim 1, wherein the second damping unit includes a base portion to be attached to the outer surface of the object, and the second acoustic damper is to be provided on an outer surface of the base portion, the outer surface facing the side opposite the object.

4. The acoustic damping device according to claim 3, wherein the base portion forms a second liner space communicating with the internal space of the object.

5. The acoustic damping device according to claim 1, wherein
the second damping unit is disposed in at least one of the axial direction in which a central axis of the object extends and a circumferential direction around the central axis of the object with respect to the first damping unit.

6. A tube assembly comprising:
a tube body formed in a tubular shape; and
the acoustic damping device according to claim 1 that is fixed to an outer peripheral surface of the tube body.

7. A combustor comprising:
the assembly according to claim 6; and
a burner that injects fuel into the tube body.

8. A gas turbine comprising:
the combustor according to claim 7; and
a turbine to be driven by combustion gas generated by the combustor.

9. A method for producing a tube assembly, the method comprising:
a step of assembling a first damping unit including a first acoustic liner forming a first liner space, and a first acoustic damper forming a first damper space;
a step of assembling a second damping unit including a second acoustic damper forming a second damper space;
a step of preparing a communication portion that is formed in a tubular shape and through which the first damper space and the second damper space communicate with each other;
a step of fixing the first damping unit to an outer surface of an object via welding;
a step of welding and fixing the second damping unit to the first acoustic liner of the first damping unit or to the outer surface of the object at least at a location between the first acoustic damper and the second acoustic damper; and
a step of disposing the communication portion across a weld portion formed by the welding and to be disposed at a position farther from the outer surface of the object than the weld portion, fixing a first end portion of the communication portion to the first acoustic damper via welding, and fixing a second end portion of the communication portion to the second acoustic damper via welding, to cause the first damper space and the second damper space to communicate with each other.

10. The acoustic damping device according to claim 1, wherein the first damping unit is formed in an annular shape extending in a circumferential direction around a central axis of the object.

11. The acoustic damping device according to claim 1, wherein the second damping unit extends in the circumferential direction (Dcc) around a central axis of the object.

12. The acoustic damping device according to claim 1, wherein the second damping unit is formed in an arc shape extending parallel to the first damping unit.

* * * * *